Figure 1:
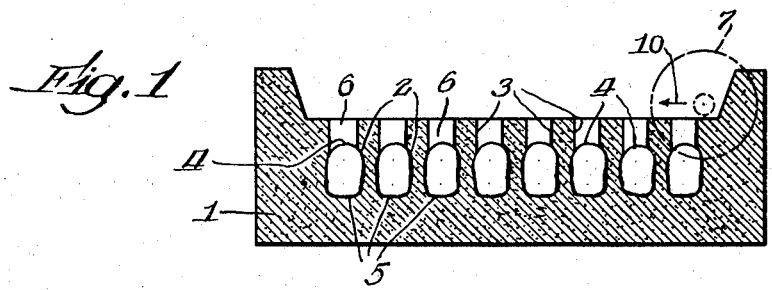

Patented July 12, 1949

2,475,599

UNITED STATES PATENT OFFICE 2,475,599

METHOD OF MAKING ARTIFICIAL TEETH

Reiner W. Erdle, Chicago, Ill., assignor to Austenal Laboratories, Incorporated, New York, N. Y., a corporation of New York Application January 10, 1947, Serial No. 721,407

4 Claims. (Cl. 18—55.1)

This invention relates, in general, to the art of making artificial teeth, and has particular relation to an improved method of forming the ridge laps and removing the sprues from the teeth.

While the particular embodiment of the invention which I shall describe hereinafter in connection with the drawing is adapted for use in making plastic or synthetic resin-like teeth, it is to be understood that it is not limited to such use but may be employed for all similar purposes, as suitable or desired.

One of the main objects of the present invention is to provide an improved method with which problems heretofore encountered in making artificial teeth and like articles are eliminated.

Another object of the invention is to provide for forming the ridge lap and removing the sprue in a manner which will lend itself to quantity production and automatic or machine handling, and which will permit low labor cost and low capital investment.

Another object of the invention is to provide a method of the class described in which the ridge lap is cut into the tooth simultaneously with the removal of the sprue from the tooth by milling or cutting through the mold body in which the tooth is formed and through the body of the tooth at the ridge lap.

Another object of the invention is to provide a method of the class described which comprises forming tooth cavities and sprue channels in a mold body with the tooth cavities in line mesially-distally with each other and having ridge laps in alignment, molding teeth and connected sprues in the tooth cavities and sprue channels, and with the molded teeth in the mold body milling through the mold body and through the teeth at the aligned ridge laps with a milling cutter to the shape of the ridge laps to remove the sprues from the teeth and, simultaneously, to cut the ridge laps into the teeth.

Figure 2:
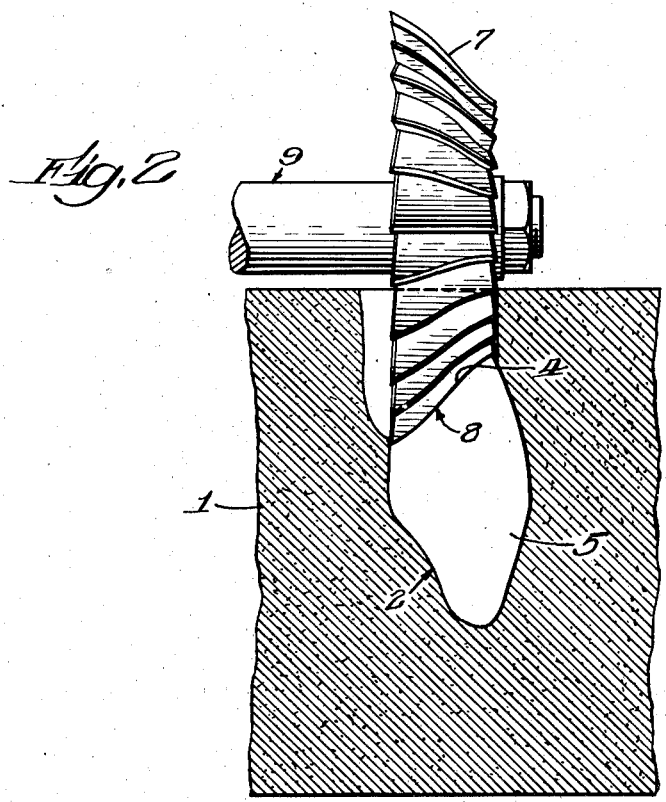

Further objects and advantages of the invention will appear from the following detailed description, taken in connection with the accompanying drawing in which:

Figure 1 is a sectional view through a tooth mold showing in labial view a plurality of tooth cavities and sprue channels with the tooth cavities in line mesially-distally with each other and having the ridge laps in alignment; also showing in dotted lines one suitable position of the milling cutter at the commencement of the milling operation; and Figure 2 is an enlarged fragmentary sectional view through the tooth mold at substantially right angles to Figure 1 and showing the operation of the milling cutter in milling through the mold body and through the teeth to remove the sprues from the teeth and, simultaneously, cut the ridge laps into the teeth.

Referring now to the drawing, the tooth mold shown at 1 may be formed, for example, of plaster of Paris, gypsum investment, Tamastone, or low fusing metal or alloy in the manner more fully disclosed in the previously identified copending application of Roy C. Feagin, or of any other suitable material and in any other suitable manner.

Where the mold body 1 is formed of plaster-like material and the teeth are formed of resin-like material, the pores of the mold body may be sealed with material that will not react deleteriously with the resin-like material and of a character to prevent seepage of the resin-like material into the mold body. This, of course, may be varied or omitted, according to the material of the mold body and the tooth material.

The mold body 1 has tooth cavities 2 and sprue channels 3 opening into the ridge lap ends thereof. The ridge lap ends of the tooth cavities 2 are shown at 4. The surfaces of the cavities 2 are preferably uninterrupted and free of parting lines.

Where there are a plurality of tooth cavities 2 as shown in the drawing, they are preferably aligned mesially-distally with each other, with the ridge lap ends 4 in alignment as shown in Figure 1. This alignment may be secured, for example, by using metal master teeth having attached metal shanks attached to a base sprue, with the ridge laps of the master teeth equidistant from the base sprue. The particular manner of obtaining this alignment may vary widely, and therefore it has not been shown in detail in the present application.

Upon completion of the mold 1, the tooth material is introduced into the tooth cavity 2 through the sprue channels 3, and the teeth 5 and their connected sprues 6 are formed in the cavities 2 and channels 3. The ridge laps of the teeth are shown at 4, as previously indicated. The teeth 5 and their connected sprues 6 may be formed of plastic or synthetic resin-like material.

After the teeth are cured or otherwise finished, they are ready to be removed from the mold 1. Since the teeth are lined up carefully in order that the ridge laps may be in a direct line with each other, a suitable milling cutter, shown at 7 and shaped at 8, as indicated in Figure 2, to the shape of the ridge laps 4 of the teeth, may be used to mill through the plaster-like mold 1 and the tooth material in order to remove the teeth 5 from their sprues 6 and, at the same time, cut the desired ridge laps 4 into the teeth. The milling cutter 7 is carried by and rotates with a rotating shaft 9, as shown in Figure 2. It may be positioned, for example, as shown in Figure 1, and moved toward the left as indicated by the arrow 10 in a direction and along a path to remove the sprues 6 from the teeth 5 and, simultaneously, to cut the ridge laps 4 into the teeth. This leaves the finished teeth 5 in the plaster-like or other mold body 1 separate from each other and from the plaster-like or other material formed in the sprue channels 3.

Any suitable knock-out device may be used to separate the plaster-like or other mold material from the surrounding metal flask (not shown). After removal of the mold from the flask it may then be placed under pressure of some type to break the teeth away from the plaster or other mold material. The teeth may then be rolled in a suitable container containing water or any suitable liquid medium to separate or wash traces of plaster from them. The teeth will then be free from the plaster mold and will be without the desired polish.

On a production basis, polishing may be accomplished in a suitable tumbling barrel ordinarily used for deburring and polishing plastic and metal articles. This barrel may be of hexagonal or octagonal shape, or may contain any suitable material which acts to provide a polishing or deburring action. The use of wooden chips are preferred for this operation because they may be separated easily from the teeth after completing the polishing.

The embodiment of the invention shown in the drawing is for illustrative purposes only, and it is to be expressly understood that such drawing and the accompanying specification are not to be construed as a definition of the limits or scope of the invention, reference being had to the appended claims for that purpose.

I claim:

1. The method of making artificial resin teeth, which comprises forming in a monolithic plaster-like mold a plurality of tooth cavities in line mesially-distally with each other and having ridge lap forming portions in alignment and sprue channels opening into said cavities from a surface of the mold, each mold cavity having a unitary and uninterrupted internal mold surface free of a parting line for forming the surfaces of the teeth, introducing the resin material into the mold cavities and sprue channels and molding the teeth in position with the teeth and ridge laps completely embedded in the mold body and inaccessible from outside the mold, milling, while the molded teeth are embedded in the mold body, through the plaster-like mold body and through the teeth at the ridge laps and along the aligned path of the ridge laps to remove the sprues from the teeth and simultaneously to cut the ridge laps into the teeth, and thereafter removing the plaster-like mold material from the teeth.

2. The method of making an artificial resin tooth, which comprises forming in a monolithic plaster-like mold a tooth cavity having a ridge lap forming portion and a sprue channel opening into the cavity from a surface of the mold, the mold cavity having a unitary and uninterrupted internal mold surface free of a parting line for forming the surfaces of the tooth, introducing the resin material into the mold cavity and sprue channel and molding the tooth in position with the tooth and ridge lap completely embedded in the mold body and inaccessible from the outside of the mold, milling, while the molded tooth is embedded in the mold body, through the plaster-like mold body and through the tooth at the ridge lap to remove the sprue from the tooth and simultaneously to cut the ridge lap in the tooth, and thereafter removing the plaster-like material from the tooth.

3. The method of making artificial teeth, which comprises forming in a monolithic mold a plurality of tooth cavities in line mesially-distally with each other and having ridge lap forming portions in alignment and sprue channels opening into said cavities from a surface of the mold, each mold cavity having a unitary and uninterrupted internal mold surface free of a parting line for forming the surfaces of the teeth, introducing the tooth material into the mold cavities and sprue channels and molding the teeth in position with the teeth and ridge laps completely embedded in the mold body and inaccessible from outside the mold, milling, while the molded teeth are embedded in the mold body, through the mold body and through the teeth at the ridge lap and along the aligned path of the ridge laps to remove the sprues from the teeth and simultaneously to cut the ridge laps into the teeth, and thereafter removing the mold material from the teeth.

4. The method of making an artificial tooth which comprises forming in a monolithic mold a tooth cavity having a ridge lap forming portion and a sprue channel opening into the cavity from a surface of the mold, the mold cavity having a unitary and uninterrupted internal mold surface free of a parting line for forming the surfaces of the tooth, introducing the tooth material into the mold cavity and sprue channel and molding the tooth in position with the tooth and ridge lap completely embedded in the mold body and inaccessible from the outside of the mold, milling, while the molded tooth is embedded in the mold body, through the mold body and through the tooth at the ridge lap to remove the sprue from the tooth and simultaneously to cut the ridge lap in the tooth, and thereafter removing the mold body material from the tooth.

REINER W. ERDLE.

REFERENCES CITED

The following references are of record in the file of this patent:

UNITED STATES PATENTS

| Number | Name | Date |
|---|---|---|
| 2,345,305 | Thornton | Mar. 28, 1944 |
| 2,386,697 | Lynch | Oct. 9, 1945 |
| 2,392,929 | Lee | Jan. 15, 1946 |